(12) United States Patent
Anderson

(10) Patent No.: US 6,275,260 B1
(45) Date of Patent: Aug. 14, 2001

(54) POSITIONING STAMPS IN IMAGES CAPTURED WITH AN IMAGE CAPTURE UNIT

(75) Inventor: Eric C. Anderson, San Jose, CA (US)

(73) Assignee: FlashPoint Technology, Inc., San Jose, CA (US)

( * ) Notice: Subject to any disclaimer, the term of this patent is extended or adjusted under 35 U.S.C. 154(b) by 0 days.

(21) Appl. No.: 08/931,673

(22) Filed: Sep. 17, 1997

(51) Int. Cl.[7] .............................. H04N 5/262; H04N 9/74
(52) U.S. Cl. .................... 348/239; 348/232; 348/333; 348/563; 348/586; 382/296
(58) Field of Search ................... 386/65, 95; 348/207, 348/232, 239, 552, 563, 564, 584, 589, 600, 601, 333, 334, 586; 382/293, 294; 345/112, 114, 433, 435, 437, 438, 439; H04N 5/76, 5/262

(56) References Cited

U.S. PATENT DOCUMENTS

| | | | |
|---|---|---|---|
| 5,262,869 | * 11/1993 | Hong | 358/209 |
| 5,463,729 | * 10/1995 | Kitaguchi et al. | 395/161 |
| 5,473,371 | * 12/1995 | Choi | 348/239 |
| 5,477,264 | 12/1995 | Sarbadhikari et al. | |
| 5,502,486 | 3/1996 | Ueda et al. | |
| 5,512,941 | * 4/1996 | Takahashi et al. | 348/81 |
| 5,579,048 | * 11/1996 | Hirasawa | 348/333 |
| 5,633,678 | * 5/1997 | Parulski et al. | 348/232 |
| 5,742,698 | * 4/1998 | Minami | 382/100 |
| 5,790,094 | * 8/1998 | Tanigawa et al. | 345/146 |
| 5,806,072 | * 9/1998 | Kuba | 348/231 |

* cited by examiner

Primary Examiner—Wendy Garber
Assistant Examiner—Ngoc-Yen Vu
(74) Attorney, Agent, or Firm—Sawyer Law Group LLP

(57) ABSTRACT

Method and system aspects for digital image stamp positioning are disclosed. A method aspect, and system for providing same, positions a stamp in a digital image captured with a digital image capture unit independently of the digital image orientation. Included are the selecting of at least two offset values for a stamp and identifying of an area in an image for placing the stamp based on the at least two offset values. Additionally included is the positioning of the stamp within the identified area based on the at least two offset values.

33 Claims, 14 Drawing Sheets

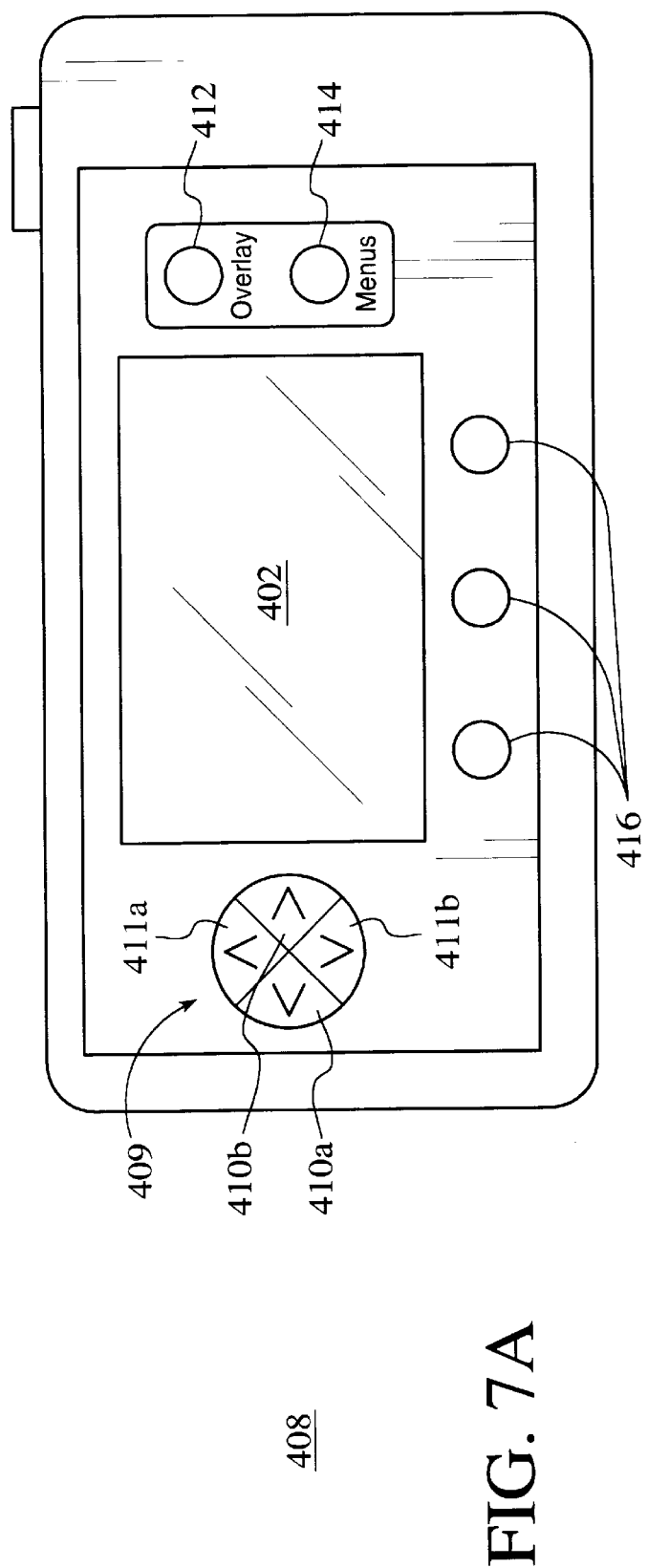
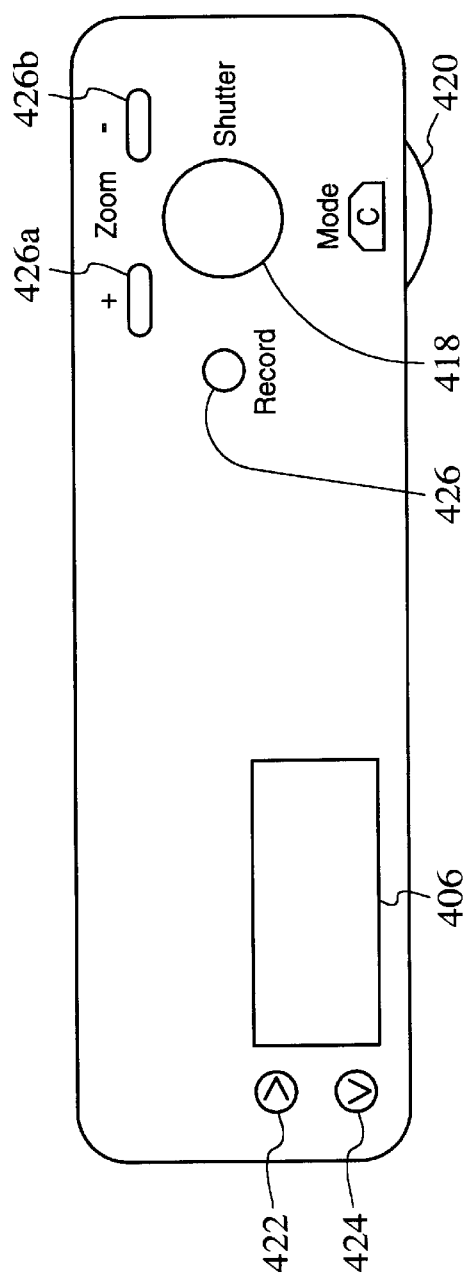
FIG. 7A
FIG. 7B

POSITIONING STAMPS IN IMAGES CAPTURED WITH AN IMAGE CAPTURE UNIT

CROSS-REFERENCE TO RELATED APPLICATIONS

The present invention is related to the following co-pending U.S. patent applications: Ser. No. 08/932,740 entitled "A Method And System For Digital Image Stamping", and Ser. No. 08/932,736 entitled "A Method And System For Translating Stamp Characteristics", which are assigned to the assignee of the present application and filed on the same date as the present application.

FIELD OF THE INVENTION

The present invention relates generally to an image capture unit and more particularly to a method and system for positioning stamps in images captured with an image capture unit.

BACKGROUND OF THE INVENTION

A popular feature in film-based cameras is a time-date stamp feature. By choosing to use the time-date stamp feature, camera users easily track when a picture was taken by recording the time and date directly on the picture's image. Some cameras offer variations for the time-date feature that allow users to select a stamp format appropriate for different regions of the world. Usually, a small integrated circuit clock chip in the camera back is included and contains LED's (light emitting diodes), which are lit to directly print on the film when the image is captured.

Other types of stamps are often desirable for different picture-taking situations. For example, professional photographers typically identity their pictures by printing their name or studio logo onto their pictures. In some cases, text indicating that the print is just a proof is used to make the proofs undesirable as final prints but still able to provide an image for making a selection and placing an order. Of course, special equipment is normally required to produce the overprinting on print paper.

With the advancement of cameras from film-base to digital-base, such features remain highly desirable. In general, modern digital cameras for taking pictures of scenes and the like typically include an imaging device which is controlled by a computer running a single threaded process. When an image is captured, the imaging device is exposed to light and generates raw image data representing the image. The raw image data is typically stored in a single image buffer where it is then processed and compressed by the processor. Many types of compression schemes are used to compress the image data, with the joint photographic expert group (JPEG) standard being the most popular. After the processor processes and compresses the raw image data into JPEG image files, the processor stores the JPEG image files into an internal memory or on an external memory card.

Some digital cameras are also equipped with a liquid-crystal display (LCD) or other type of display screen on the back of the camera. Through the use of the LCD, the processor can cause the digital camera to operate in one of two modes, record and play, although some cameras only have a record mode. In record mode, the LCD is used as a viewfinder in which the user may view an object or scene before taking a picture. In play mode, the LCD is used a playback screen for allowing the user to review previously captured images either individually or in arrays of four, nine, or sixteen images.

The ability to form, place, and apply multiple types of stamps is limited in typical digital cameras. For example, to apply a stamp of a text or a logo into a digital image, typically digital cameras require a picture of the text or logo to be taken. The image captured can then be sized and positioned to fit into constrained box positions across the top, middle, or bottom of another captured image. The need to have images captured for any text or graphical element for use as a stamp severely restricts the ability to freely add stamps to digital images. Further, the constrained areas for placement further limits the usefulness of "stamping" through these techniques.

Further, the use of even a time-date stamp in digital images has limitations. Applying a time-date stamp in a digital camera through the use of creation in software and application during image processing is fairly straightforward, however, difficulties arise when the orientation of an image changes. In digital cameras employing an orientation sensor, the image is automatically rotated during image processing, so that the proper orientation is shown when displayed on the LCD. Unfortunately, a problem arises in determining how the application of the time-date stamp adjusts to the orientation of the image.

Therefore, a need exists for a method and system for positioning stamps, including time-date stamps, in digital images that is definable and automatically adjusts to the orientation of the image.

SUMMARY OF THE INVENTION

Method and system aspects for digital image stamp positioning are disclosed. A method aspect, and system for providing same, positions a stamp in a digital image captured with a digital image capture unit independently of the digital image orientation. Included are the selecting of at least two offset values for a stamp and identifying of an area in an image for placing the stamp based on the at least two offset values. Additionally included is the positioning of the stamp within the identified area based on the at least two offset values.

Through the present invention, stamps are suitably positioned at user-selected locations in a image. Further, the indication of position remains independent of image orientation, so that changes in orientation do not hinder desired stamp positioning. These and other advantages of the aspects of the present invention will be more fully understood in conjunction with the following detailed description and accompanying drawings.

BRIEF DESCRIPTION OF THE DRAWINGS

FIGS. 7A and 7B are diagrams depicting the back and top view, respectively, of a digital camera.

DETAILED DESCRIPTION OF THE INVENTION

The present invention relates to a method and system for providing stamps in digital images. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
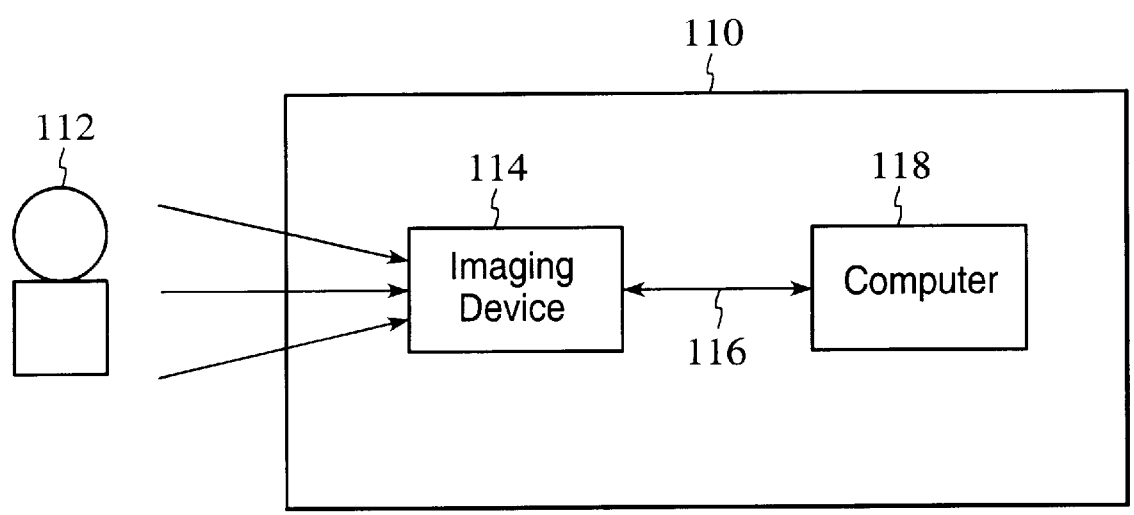
FIG. 1 is a block diagram of a digital camera that operates in accordance with the present invention.

Referring now to FIG. 1, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
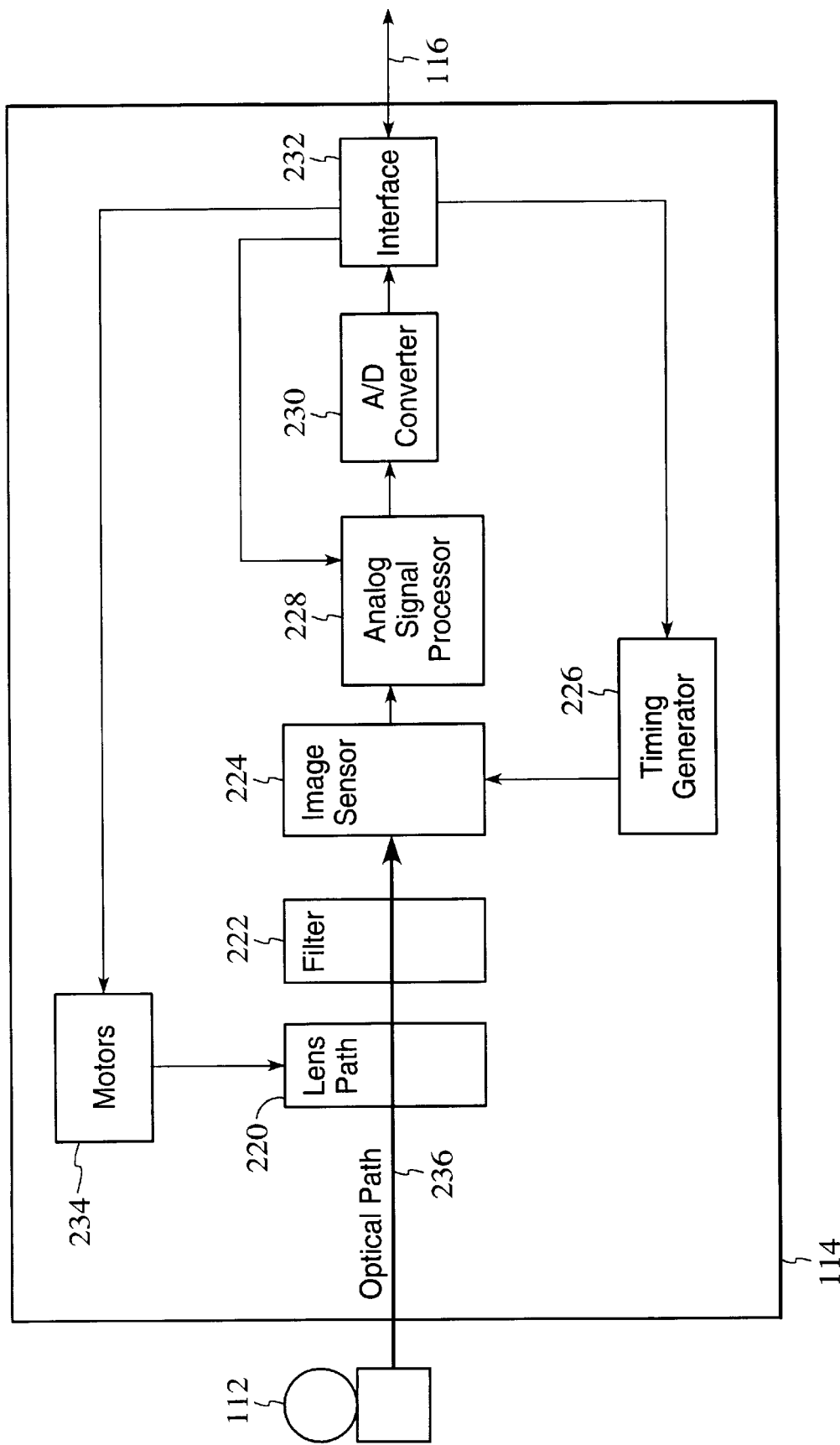
FIG. 2 is a block diagram of an example embodiment for the imaging device of FIG. 1.

Referring now to FIG. 2, a block diagram of an example embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured object 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118 (FIG. 1).

Figure 3:
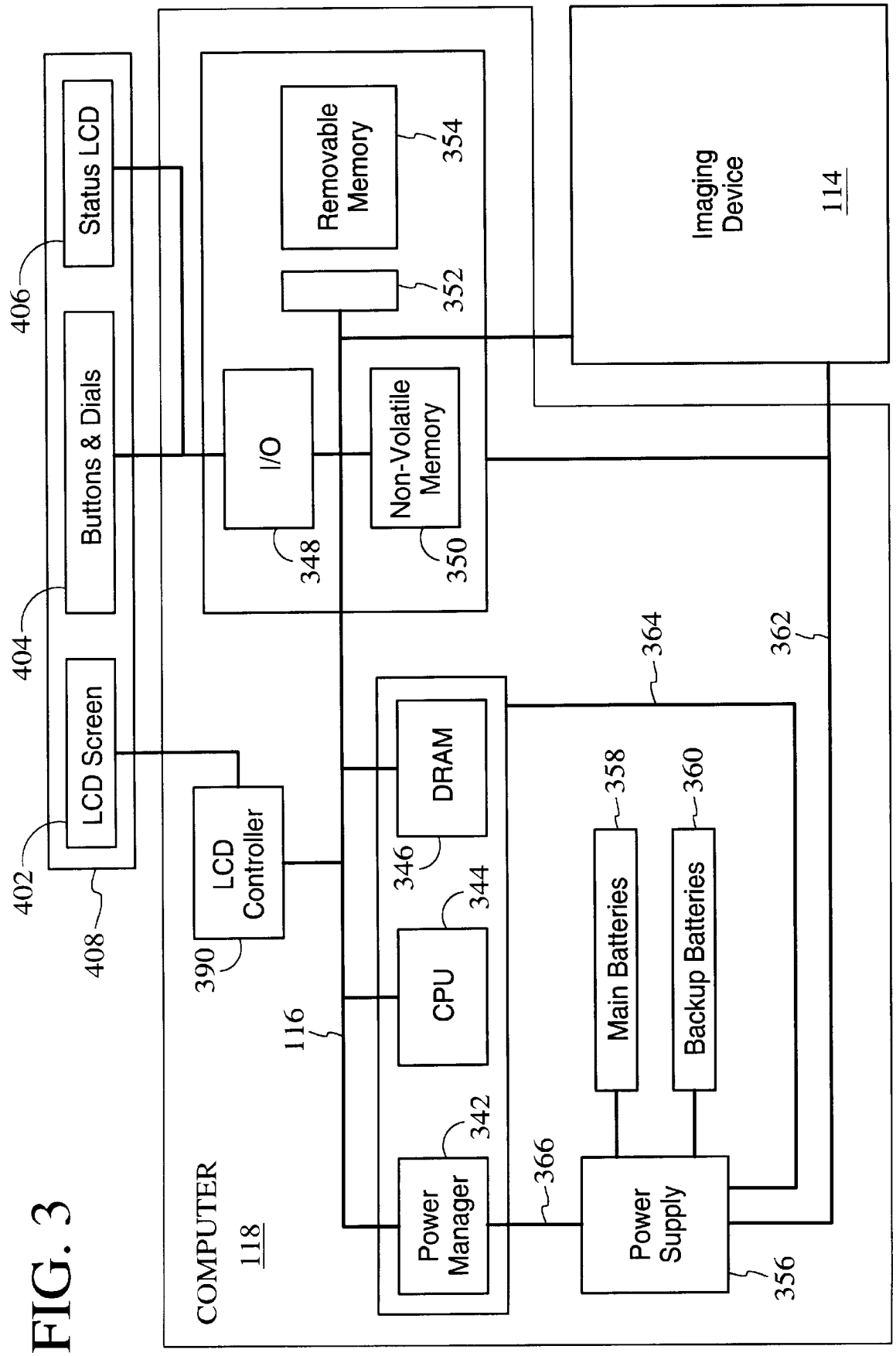
FIG. 3 is a block diagram of an example embodiment for the computer of FIG. 1.

Referring now to FIG. 3, a block diagram of an example embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk. Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4A:
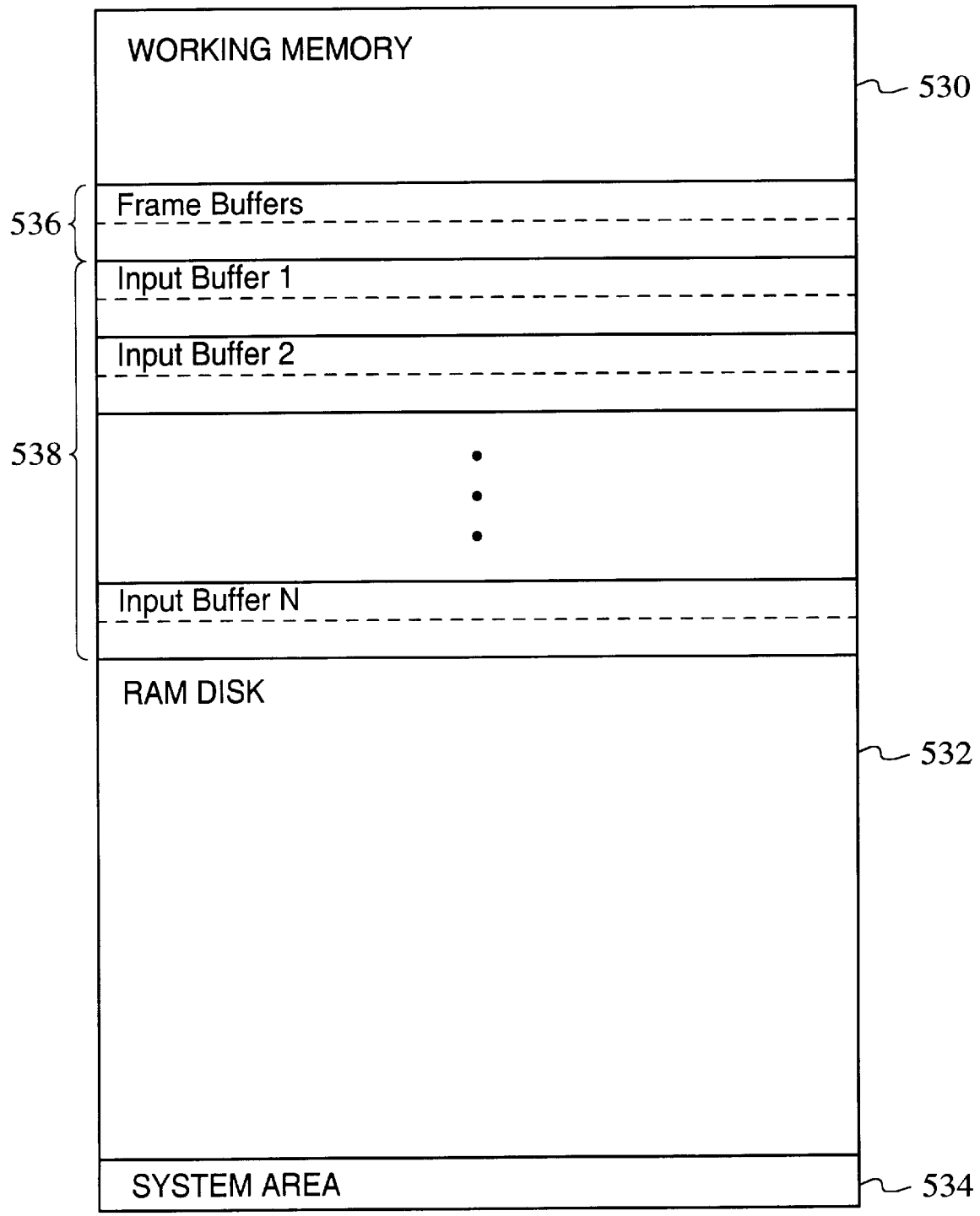
FIG. 4A is a memory map showing an example embodiment of the Dynamic Random-Access-Memory (DRAM).

Referring now to FIG. 4A, a memory map showing an example embodiment of dynamic random-access-memory (DRAM) 346 is illustrated. In the example embodiment, DRAM 346 includes RAM disk 532, a system area 534, and working memory 530.

RAM disk 532 is suitably a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348 (FIG. 3), to readily recognize and access the data stored on RAM disk 532. System area 534 typically stores data regarding system errors (for example, why a system shutdown occurred) for use by CPU 344 (FIG. 3) upon a restart of computer 118.

Working memory 530 suitably includes various stacks, data structures and variables used by CPU 344 while executing the software routines used within computer 118. Working memory 530 also includes several input buffers 538 for temporarily storing sets of raw image data received from imaging device 114 (FIG. 3), and a frame buffer 536 for storing data for display on the LCD screen 402 (FIG. 3). In a preferred embodiment, each input buffer 538 and frame buffer 536 are split into two separate buffers, called ping-pong buffers (shown by the dashed lines), to improve the display speed of the digital camera and to prevent the tearing of the image in the display 402.

Figure 4B:
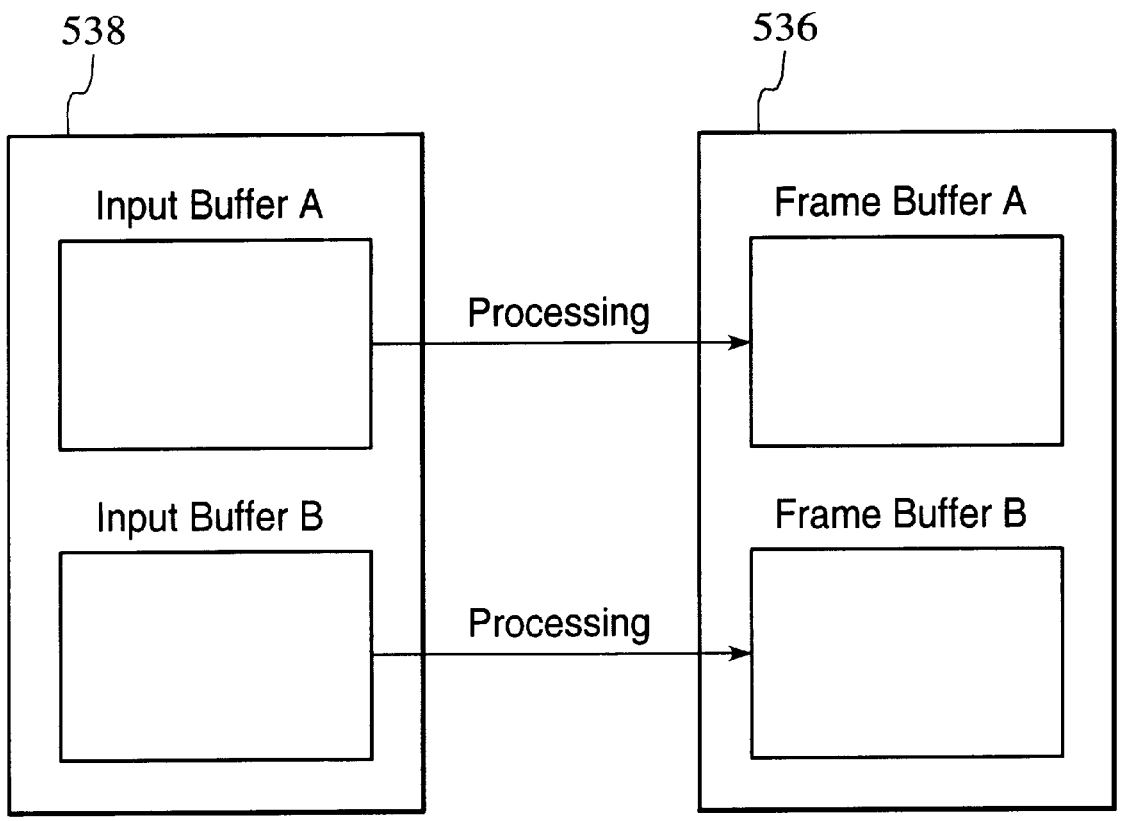
FIG. 4B is a block diagram illustrating the contents of one of the input buffers and the contents of the frame buffer.

Referring now to FIG. 4B, the contents of one of the input buffers 538 and the contents of the frame buffer 536 are illustrated. As shown, each input buffer 538 includes an input buffer A and an input buffer B, and the frame buffer 536 includes a frame buffer A and a frame buffer B. The input buffers A and B of input buffer 538 alternate between an input cycle and a processing cycle. During the input cycle, the input buffers 538 are filled with raw image data from the image device 114, and during the processing cycle, CPU 344 processes the raw data and transmits the processed data to the frame buffers 536. The size of the input buffers 538 may vary, but in a preferred embodiment, two of the input buffers 538 are required to contain a full resolution image. One input buffer 538 can therefore contain one image captured at ½ resolution. Since the LCD is capable of displaying images at ¼ resolution, the images generated during a live view process are also ¼ resolution and are therefore be stored in one-half, or in one of the ping-pong buffers of an input buffer 538.

Figure 5:
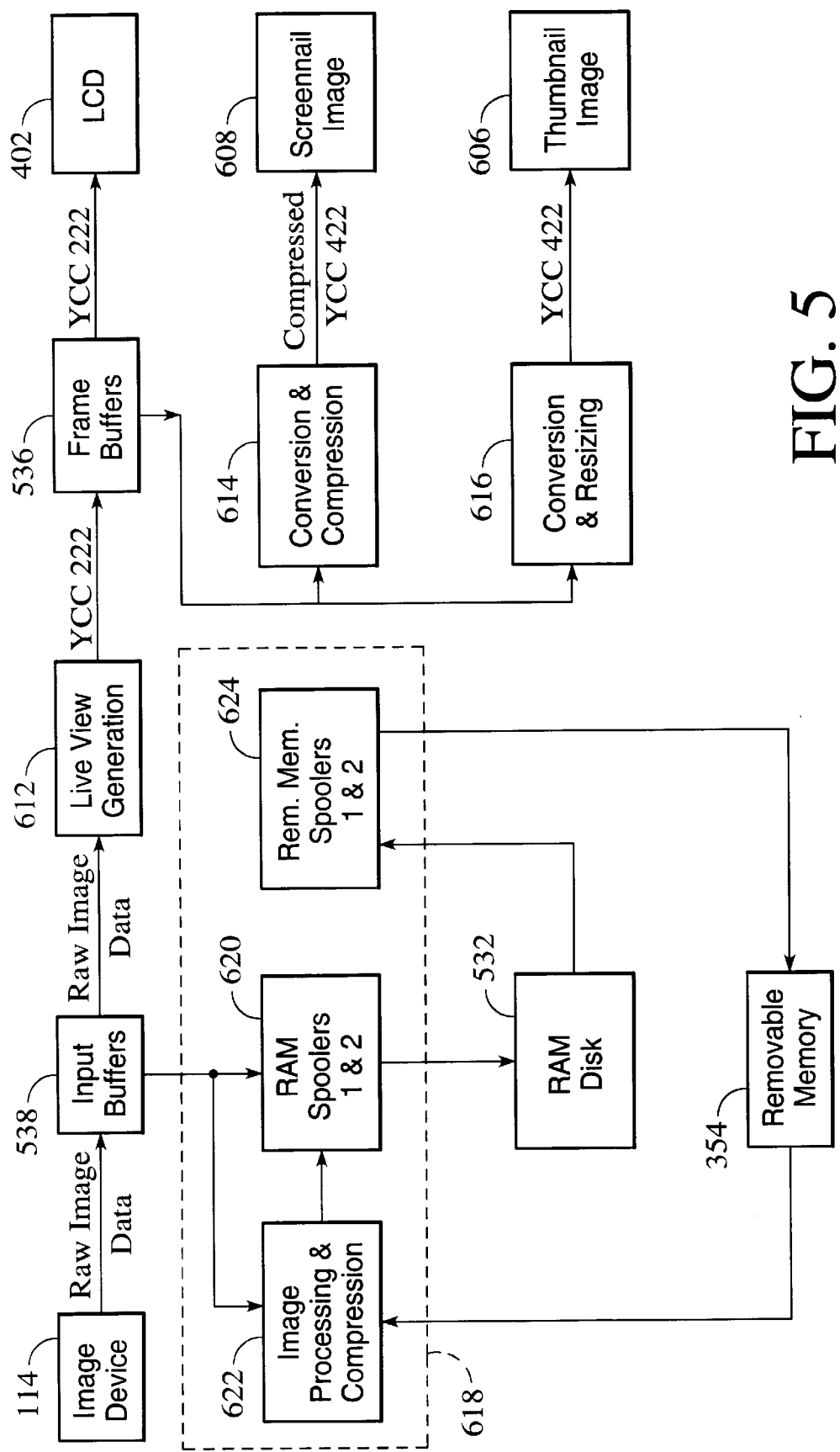
FIG. 5 is a block diagram illustrating the image file generation process, which begins when the camera is in capture mode and the user presses the shutter button to capture an image.

Referring now to FIG. 5, in a preferred embodiment, the processing of image data is performed by a live view generation process 612, which is stored in non-volatile memory 350 (FIG. 3) and executed on CPU 344. However, the image processing can also be implemented using hardware. During the execution of the live view generation process 612, the CPU 344 takes the raw image data from the input buffers 538, typically in CCD format, and performs color space conversion on the data. The conversion process performs gamma correction and converts the raw CCD data into either a RGB or YCC color format which is compatible with the LCD screen 402. (RGB is an abbreviation for Red, Green, Blue, and YCC is an abbreviation for Luminance, Chrominance-red and Chrominance-blue). After converting the data to YCC, the YCC image data is stored in the frame buffer 536. The LCD controller 390 (FIG. 3) then transfers the processed image data from the frame buffers to the LCD screen 402 for display.

Figure 6:
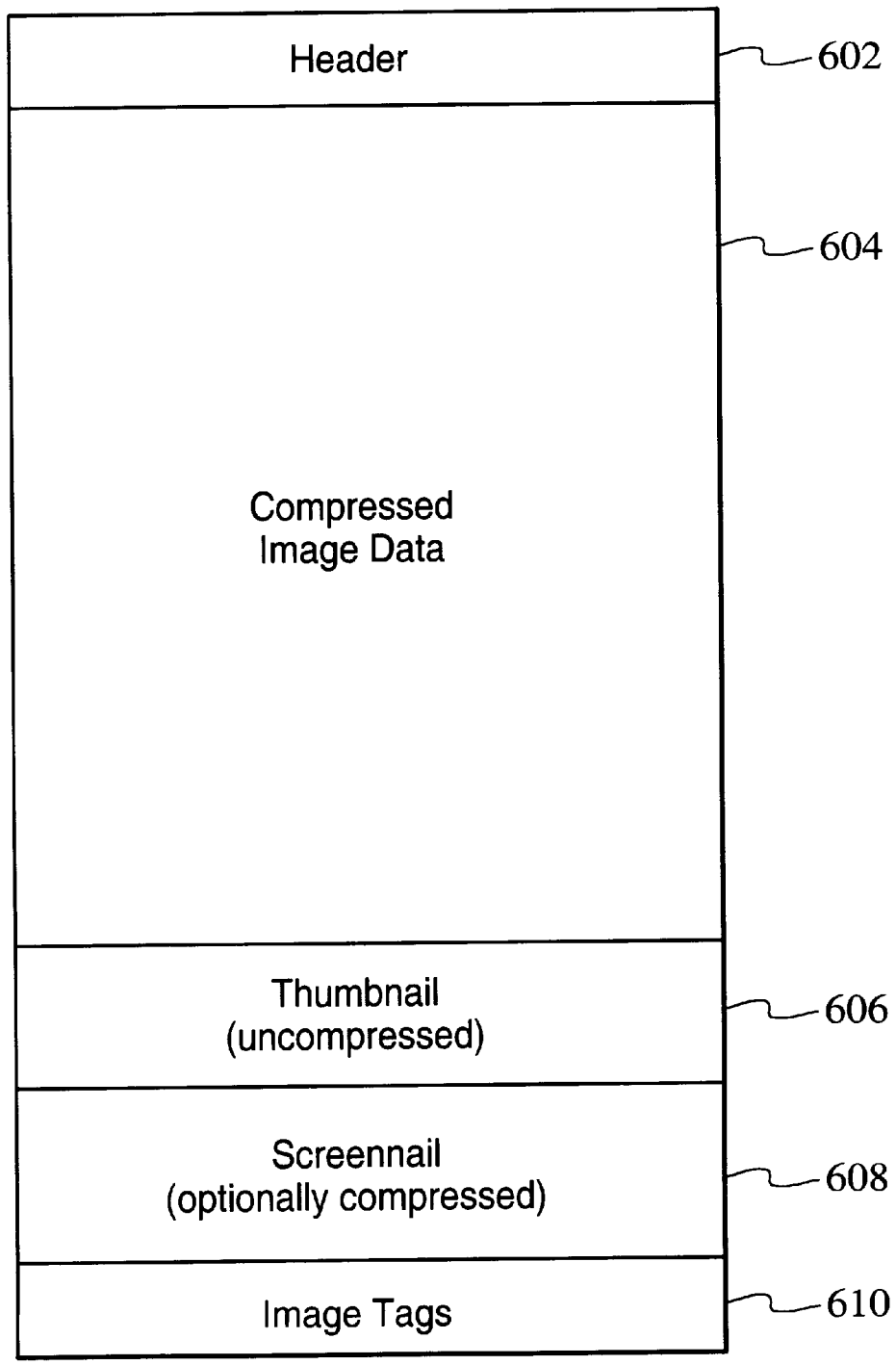
FIG. 6 is a block diagram illustrating an enhanced format of a still image file.

The raw image data is suitably captured by the image device 114, e.g., when a shutter button is pressed, at a resolution set by the user, and the raw image data is stored into an appropriate number of input buffers 538. The raw image data is then used to generate an enhanced image file 600 for the captured image, as shown in FIG. 6, which is preferably created for each image as the user takes pictures while the camera is in capture mode. The image file 600 suitably includes a header 602, compressed image data 604, a thumbnail image 606, a screennail 608, and an image tag field 610. The image file 600 may also include a sound file (not shown) if a sound clip has been attached to the particular image.

The header 602 includes information identifying the particular image file and the image represented by the image data 604. The image data 604 is the actual data comprising the full-sized captured image in compressed form, preferably in JPEG format. Although the user can typically choose the resolution mode in which images are captured, once an image is processed and compressed, the compressed image data 604 is the high-resolution representation of the image compared to the thumbnail 606 and screennail 608.

The thumbnail image 606 suitably refers to a small, uncompressed low-resolution version of the image. In a preferred embodiment, the pixel size of thumbnail image 606 is less than the display size of the LCD screen 402 (e.g., 80×60 pixels), and has a storage size of approximately ten kilobytes. The screennail image 608 suitably refers to a medium-resolution version of the image and in a preferred embodiment is also compressed, although compressing the screennail 608 is optional. Unlike the thumbnail image 606, the screennail image 608 is display-sized and fills the visible area of the LCD screen 402 when displayed.

After the thumbnail image 606 and the screennail 608 are generated, they are stored in working memory 530 until the compressed image data 604 is generated. The compressed image data 604 may be generated either before or after the thumbnail and screennail images 606 and 608. However, in a preferred embodiment, the compressed image data 604 is generated after the thumbnail and screennail images 606 and 608 are generated using a background spooling process 618. In an alternative embodiment, the thumbnail image 606 and the screennail 608 may be generated by the background spooling process 618 along with the compressed image data 604. The details of background spooling are presented more fully in co-pending U.S. patent application, Ser. No. 08/872,578 unknown, entitled "A Method and System for Accelerating a User Interface of an Image Capture Unit During Play Mode", filed Jun. 10, 1997 and assigned to the assignee of the present invention, the details of which are incorporated herein by reference in its entirety.

The image tag field 610 includes information, preferably in the form of tags, regarding the image represented by the image data 604. Media type tags, for instance, indicate all the media types associated with the image, such as whether the image is a single image or a panorama image, for example. In certain operating modes, the media type tags are used to select the type of icon that is displayed in the LCD 402 along side the thumbnail image 606. Besides media tags, the image tag field 610 may also include other types of tags for storing additional information regarding the image and/or the camera 110 itself. For example, a tag could be used to indicate the settings of the camera 110 at the time the image was captured, or indicate the identity of the camera manufacturer, for instance.

FIGS. 7A and 7B are diagrams depicting the preferred hardware components of the camera's 110 user interface 408. FIG. 7A is back view of the camera 110 showing the LCD screen 402, a four-way navigation control button 409, an overlay button 412, a menu button 414, and a set of programmable soft keys 416. FIG. 7B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The resolution of the LCD screen 402 may vary; however, the LCD screen resolution is usually much less than the resolution of the image data that's produced by imaging device 114 when the user captures an image at full resolution. Typically, the resolution of LCD is ¼ the video resolution of a full resolution image. Further, the LCD 402 facilitates the display of the information in media tags, such as in textual form, when accessed through the buttons on the camera interface.

Preferably, the digital camera is provided with several different operating modes for supporting various camera functions. Included among the digital camera's multiple operating modes are capture (record), review, and play mode. In capture mode, the camera 110 supports the actions of preparing to capture an image, and capturing an image through the use of either the LCD screen 402 alone or the status LCD 406 with the aid of an optional optical viewfinder (not shown). In review mode, the camera 110 supports the actions of reviewing camera contents, editing and sorting images, and printing and transferring images. In play mode, the camera 110 allows the user to view screen-sized images in the LCD screen 402 in the orientation that the image was captured. Play mode also allows the user to hear recorded sound associated to a displayed image, and to play back sequential groupings of images, which may comprise time lapse, slide show, and burst image images. The user preferably switches between the capture, review, and play modes, using the mode dial 420. When the camera is placed into a particular mode, that mode's default screen appears in the LCD screen 402 in which a set of mode-specific items, such as images, icons, and text, are displayed. Through the use of multiple operating modes, the camera functions and features can be categorized, which allows for faster access to those features and functions than would be possible by nesting all the features in one play mode as in conventional digital cameras.

Figure 8:
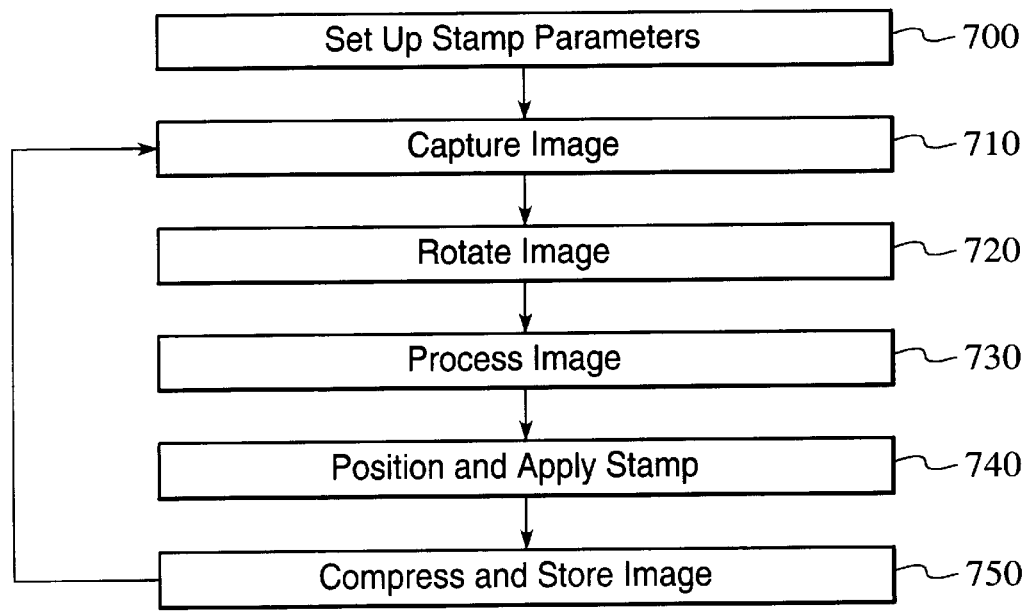
FIG. 8 illustrates a data flow diagram for stamping digital images in accordance with one aspect of the present invention.

Another aspect of operation in the digital camera 110 in accordance with the present invention is image stamping. A preferred method for supplying a stamp for an image is illustrated in FIG. 8 and initiates with the setting up of stamp parameters (step 700). In a preferred embodiment, multiple types of stamps may be applied to an image. Three such stamp types include a time-date stamp, a string stamp, and a graphics stamp.

For all of the stamp types, preferably one parameter that is designated is the position of the stamp. The location of the stamps is suitably specified by offset values of x (horizontal) and y (vertical) coordinates, as described with reference to FIG. 9A. Suitably, the values for x and y may be provided in various forms. A preferred form is a percentage value, e.g., 0–100%, where 100% represents the entire width or height of the image. Further, with percentage values used, centered stamps along the width or height of the image (i.e., center justification) may be specified. Thus, a specified value of 50% for the x value suitably positions the stamp along the center of the width, e.g., stamps B, E, and H in FIG. 9A.

Figures 9A, 9B:
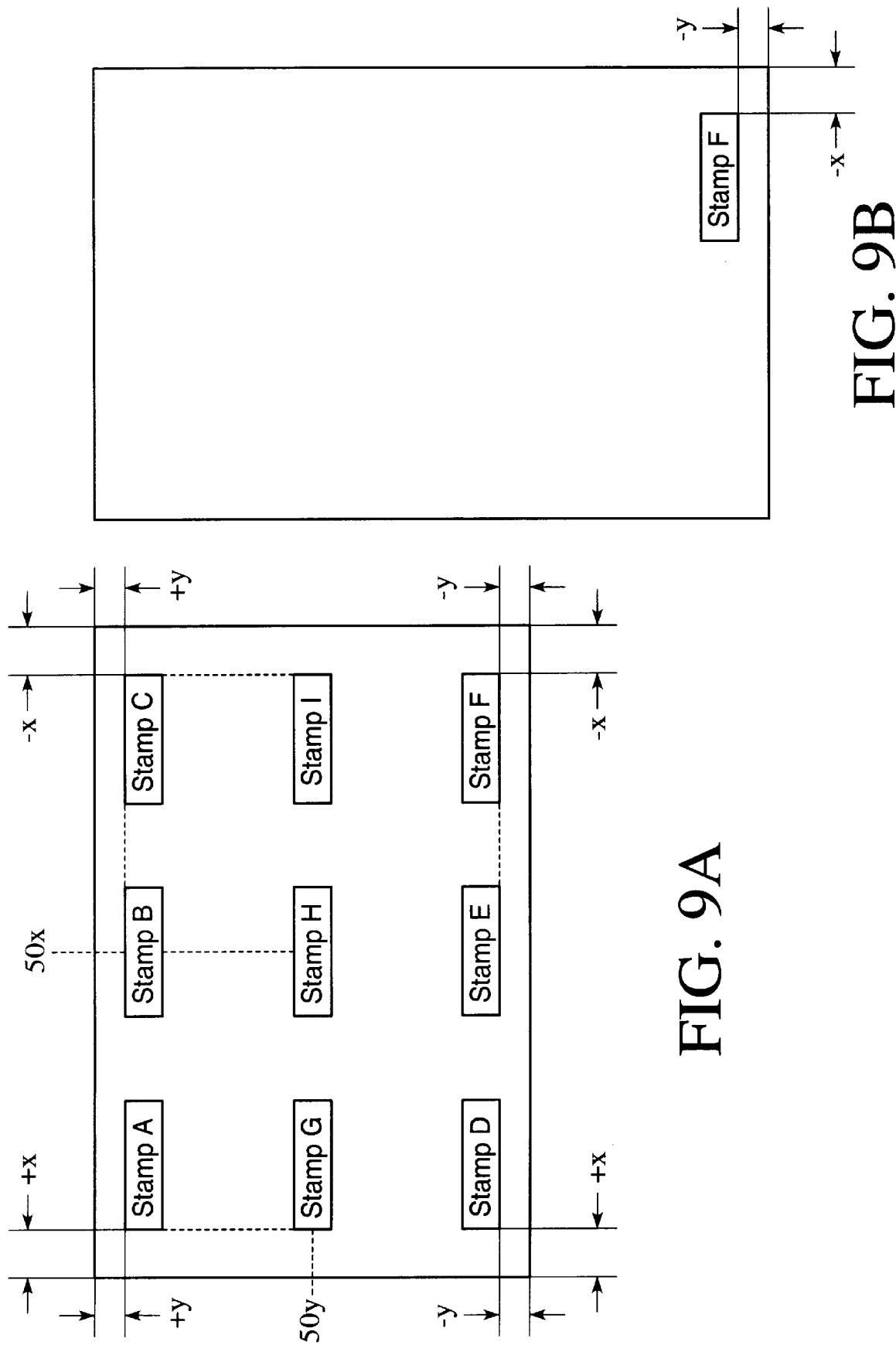
FIGS. 9A and 9B illustrate two examples of positioning of stamps independently of image orientation in accordance with one aspect of the present invention.

Further, a specified value of 50% for the y value suitably positions the stamp along the center of the height, e.g., stamps G, I, and H in FIG. 9A. Stamp H is suitably positioned in the center of the image through selection of 50% values for both horizontal and vertical offset values.

By way of further example, when the vertical coordinate is below 50% (e.g. 0–49), the value indicates the offset of the top of the stamp from the top of the image (i.e., top justification), e.g., stamps A, B, and C. When the vertical coordinate is above 50% (e.g. 51–100), the value indicates the offset of the bottom of the stamp to the bottom of the image (i.e., bottom justification), e.g., stamps D, E, and F. When the horizontal coordinate is below 50%, the value indicates the offset of the left side of the stamp from the left side of the image (i.e., left justification), e.g., stamps A, D, and G. When the horizontal coordinate is above 50%, the value indicates the offset of the right side of the stamp from the right side of the image (i.e., right justification), e.g., stamps C, F, and I.

In an alternate embodiment, positive and negative signed values indicate the horizontal and vertical offset values. Thus, for example, positive y offsets suitably indicate top justification, while negative y values indicate bottom justification. Positive x offsets suitably indicate left justification, while negative x offsets indicate right justification.

Thus, through the indication of positioning capably provided as horizontal and vertical offset values, the stamp is placed in an image independently of the image orientation. FIG. 9B illustrates application of stamp F in an image with a portrait orientation. The specified offset values of x and y suitably position stamp F in the lower right quadrant offset from the lower right corner of the image relative to the lower right corner of stamp F. Changes in orientation, e.g., from landscape to portrait, therefore do not hinder appropriate stamp positioning when performed in accordance with the present invention. Thus, proper positioning results for various possible orientations, including landscape normal, portrait left, portrait right, and upside-down landscape, when needed.

Figure 10A:
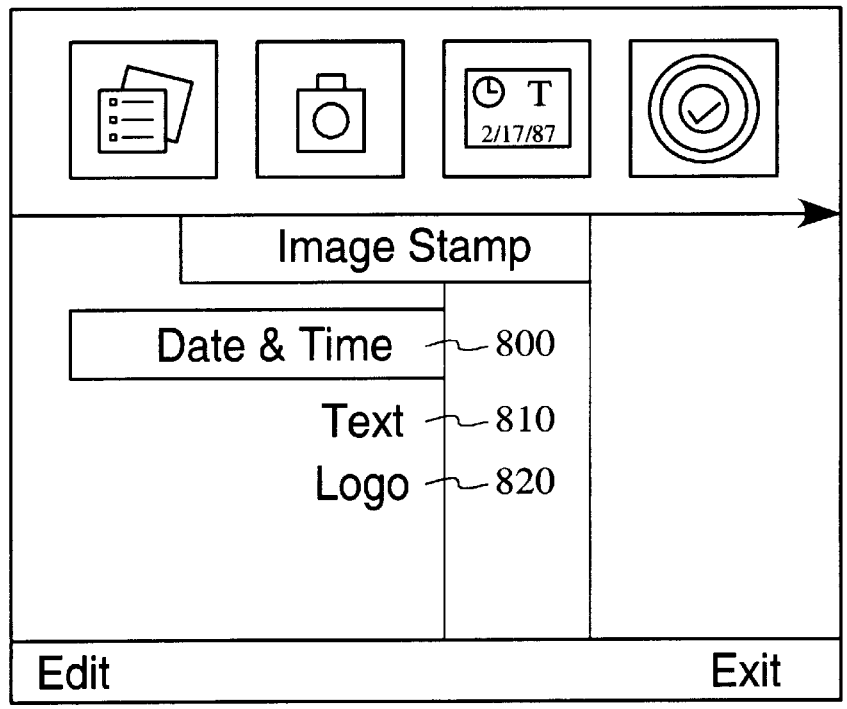
FIGS. 10A, 10B, 10C, and 10D illustrate various examples of stamp selection in accordance with the present invention.

In addition to setting up the position of the stamp, the type and characteristics of the stamp are also preferably set up before capture of the image data. FIG. 10A suitably illustrates a display on the LCD 402 that facilitates selection of an image stamp type, such as by providing selectors for Date & Time 800 (e.g., a time-date stamp), Text 810 (e.g., a string stamp), and Logo 820 (e.g., a graphics stamp).

Figure 10B:
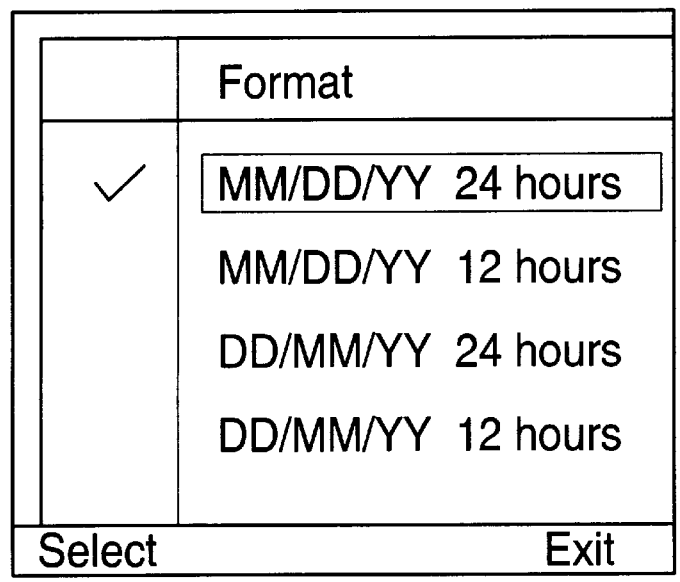

For a time-date stamp, suitably the time and date in various formats are user selectable. For example, FIG. 10B illustrates various time-date stamp formats that would be suitable for inclusion as default formats selectable by a user. The format preferably automatically changes when a different region is selected, so that for each region, multiple selections are available. Further, the color of the text within the time-date stamp is suitably user-determined, as well as the background color. Alternatively, the background may also be specified as transparent, so that the image itself acts as the background to the text. Font and font size, e.g., Chicago 10 point, also are preferably specified to indicate the desired text size and style for the stamp. Of course, individual fonts and font sizes are determined by those available in a particular camera. Further, standard selections may be provided in a desired format on the camera interface for easing selection by a user.

Figure 10C:
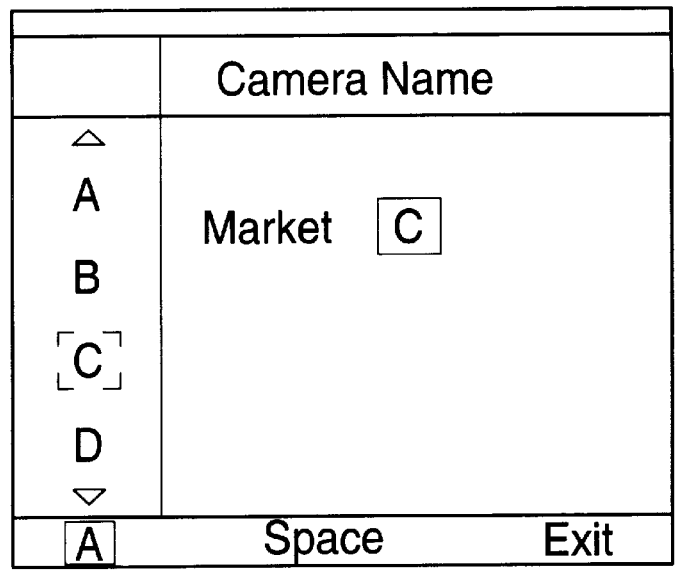

Similar to the characteristics of the time-date stamp, a string stamp also has selectable color characteristics and background characteristics, as well as font and font size. Of course, the text that is to be used as the string stamp must also be specified. In a preferred embodiment, a string stamp comprises up to 31 characters that may be selected via a suitable character input mechanism, including an alphabetic menu displayed on the camera's display, for example, as shown in FIG. 10C. With the string stamp, images are suitably labelled as desired, such as with the name of the location of the image, the name(s) of any person(s) in the image, a phrase for the occasion captured in the image, etc.

Figure 10D:
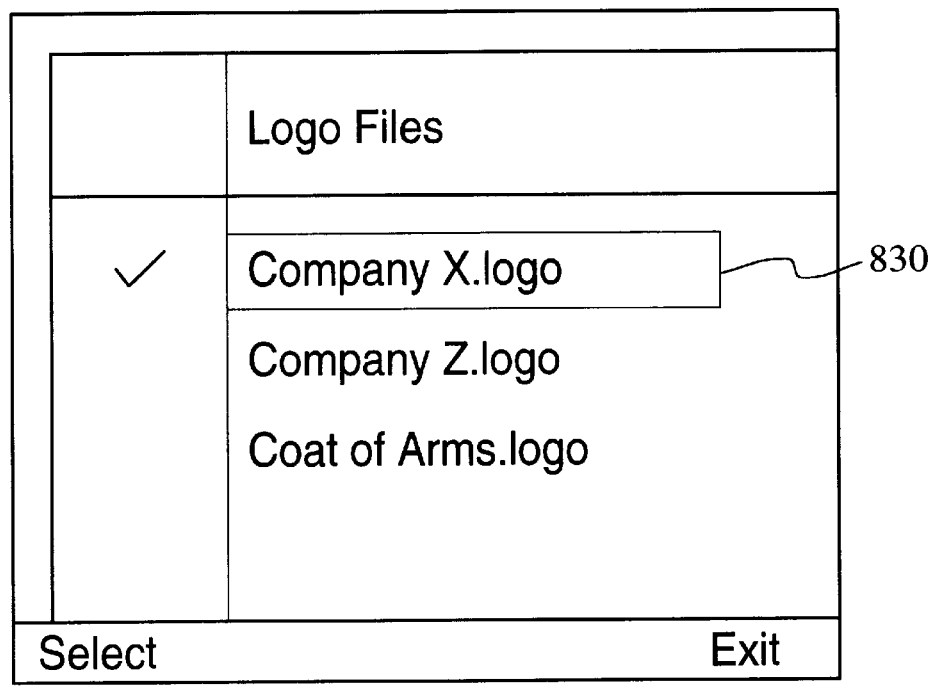

The graphics stamp suitably comprises any desired graphical element with a selected level of transparency, thus forming a type of watermark on the image. Creation of the graphic stamp with the selected level of transparency preferably occurs in a graphics program, such as Adobe Photoshop. Two types of graphic stamps are suitably supported and include a standard three-channel type, and a four-channel type. For the three-channel type, the graphics stamp basically comprises an RGB graphics element that occludes the image where the graphics is applied (thus having a transparency level of 0%). For the four-channel type graphic, an alpha blending component is suitably indicated in addition to the RGB levels. Thus, a predetermined amount of mixing between the graphic stamp and the image is provided on a pixel-by-pixel basis in the graphic stamp. Suitably, files containing the data for a graphics stamp are downloaded to the camera itself to allow selection of a particular graphic stamp via the camera interface, as shown in FIG. 10D. For example, a company's logo 830 could be provided as a selectable graphic stamp. By way of further example, in digital video image cameras, a predetermined graphic stamp could include a broadcasting station's logo to allow inclusion of the logo with each frame of the video image.

The following list provides examples of the parameters, including parameter type and description for the three types of described stamps.

PIC: File Name—provides a file name for a PICT or TIFF graphic stamp
STR: String—a string for a string stamp
PXP, PYP: Integer—positions of the respective horizontal and vertical corners of a graphics stamp
SXP, SYP: Integer—positions of the respective horizontal and vertical corners of a string stamp
TXP, TYP: Integer—positions of the respective horizontal and vertical corners of a time-date stamp
SFC, SBC: Integer—color of text and background, respectively, for a string stamp, as referenced off of a color palette in the system
TFC, TBC: Integer—color of text and background, respectively, for a time-date stamp, as referenced off of a color palette in the system
STS, SFN: Integer—font size and font, respectively, of a string stamp
TTS, TFN: Integer—font size and font, respectively, of a time-date stamp
ENA: Bitflags—bits to control turning each stamp type on/off (1 or 0); e.g., bit 0 (least significant) controls a time-date stamp, bit 1 controls a string stamp, and bit 2 control a graphics stamp.

Once the stamp(s) are set up, the process of FIG. 8 continues with the capturing of images (step 710). The desired image data is thus suitably stored in a memory buffer in the camera, as described previously with reference to FIGS. 5 and 6. Any rotation of the image data is then performed (step 720). A process for rotation of image data is suitably described in co-pending U.S. patent application, filed Feb. 6, 1997, Ser. No. 08/795,587, entitled "Apparatus and Method for Camera Image and Orientation Capture", assigned to the assignee of the present invention. The raw CCD data is then suitably converted to a fully reconstructed image in a standard color space, such as CCIR 601, (step 730). Once processed, the stamp data is applied and added to the image file (step 740). The image data is then suitably compressed and stored (step 750), the compression aiding in the conservation of memory space, as described above with reference to FIGS. 5 and 6. Alternatively, background spooling (618, FIG. 5) may be employed for performing steps 720, 730, 740, and 750, in which case, capturing images (step 710) may continue successively.

Figure 11:
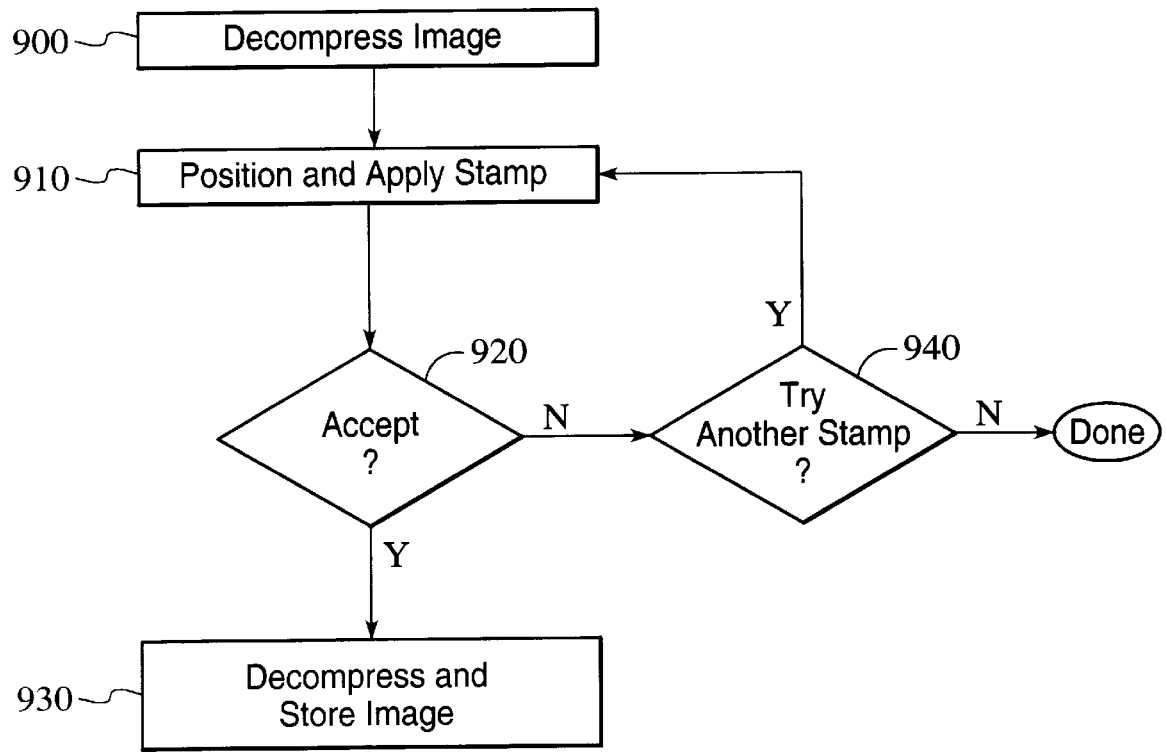
FIGS. 11 and 12 illustrate data flow diagrams for post-capture image stamping in accordance with an alternate example embodiment of the present invention.

In an alternate embodiment, the attachment of the stamp occurs after the image data has been captured rather than during the capture, i.e., step 740 is eliminated from the process of FIG. 8. FIG. 11 suitably illustrates an alternate embodiment for post-capture stamping. The process initiates with decompression of the image data (step 900). A selected stamp is then applied and positioned (step 910). Preferably, the user is able to see at least a screennail version of the image when the stamp is applied and positioned, as described below with reference to FIG. 12. A user then determines whether to accept the present version of the image with the stamp (step 920). When accepted, the image with the stamp is compressed and stored (step 930). When the stamp is not accepted, a determination is made as to whether application of another stamp is desired (step 940). When another stamp is tried, the process returns to step 910. When another stamp is not desired, the process is completed.

Figure 12:
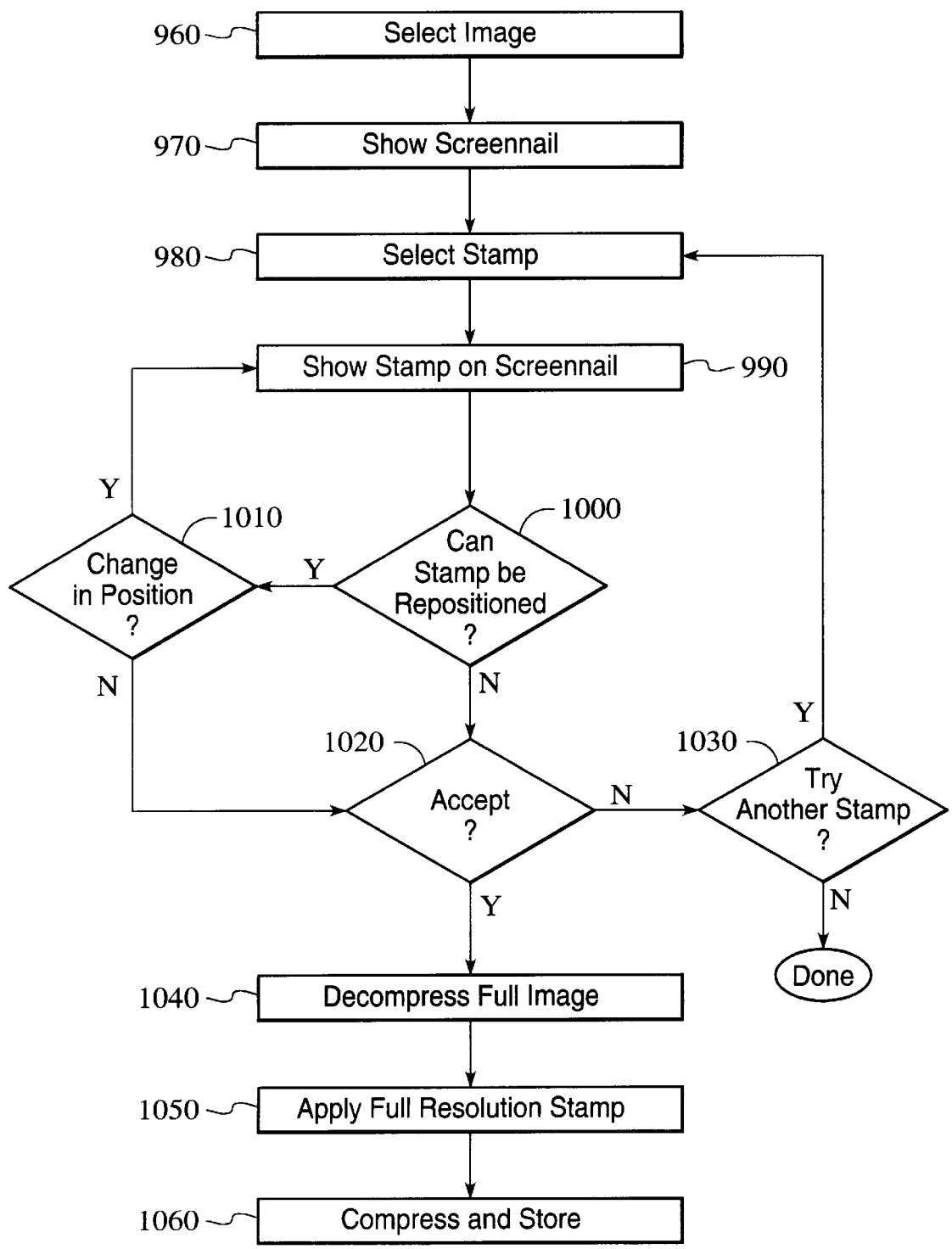

FIG. 12 illustrates a flow diagram of a suitable method for selection of a stamp for post-capture stamping. A user suitably selects an image from a thumbnail display (step 960) which is then displayed as a screennail image (step 970). A stamp is then suitably selected (step 980) and shown on the screennail image (step 990). A determination of whether the stamp can be repositioned occurs (step 1000), and when it can, a determination of whether there is a change in the position occurs (step 1010). In an example embodiment, a user changes stamp position using the four-way controller 409 (FIG. 7A). When there is a change in position, the process returns to step 990 to display the stamp in the new position on the screennail. When the stamp cannot be repositioned, e.g., when a watermark overlays an entire image, or no change occurs in the position, the current stamp is accepted or rejected (step 1020). When rejected, a determination of whether another stamp is desired occurs (step 1030), which, when affirmative, returns the process to stamp selection (step 980). When no other stamp is desired, the process is completed. When the stamp is accepted, the full image is decompressed (step 1040), and a full resolution stamp is applied (step 1050). The image with the stamp is then compressed and stored (step 1060). In an alternate embodiment, rather than adding the stamp to an image by inserting the stamp into the image data, the stamp may be appended to the image file without damaging the original image.

Figure 13:
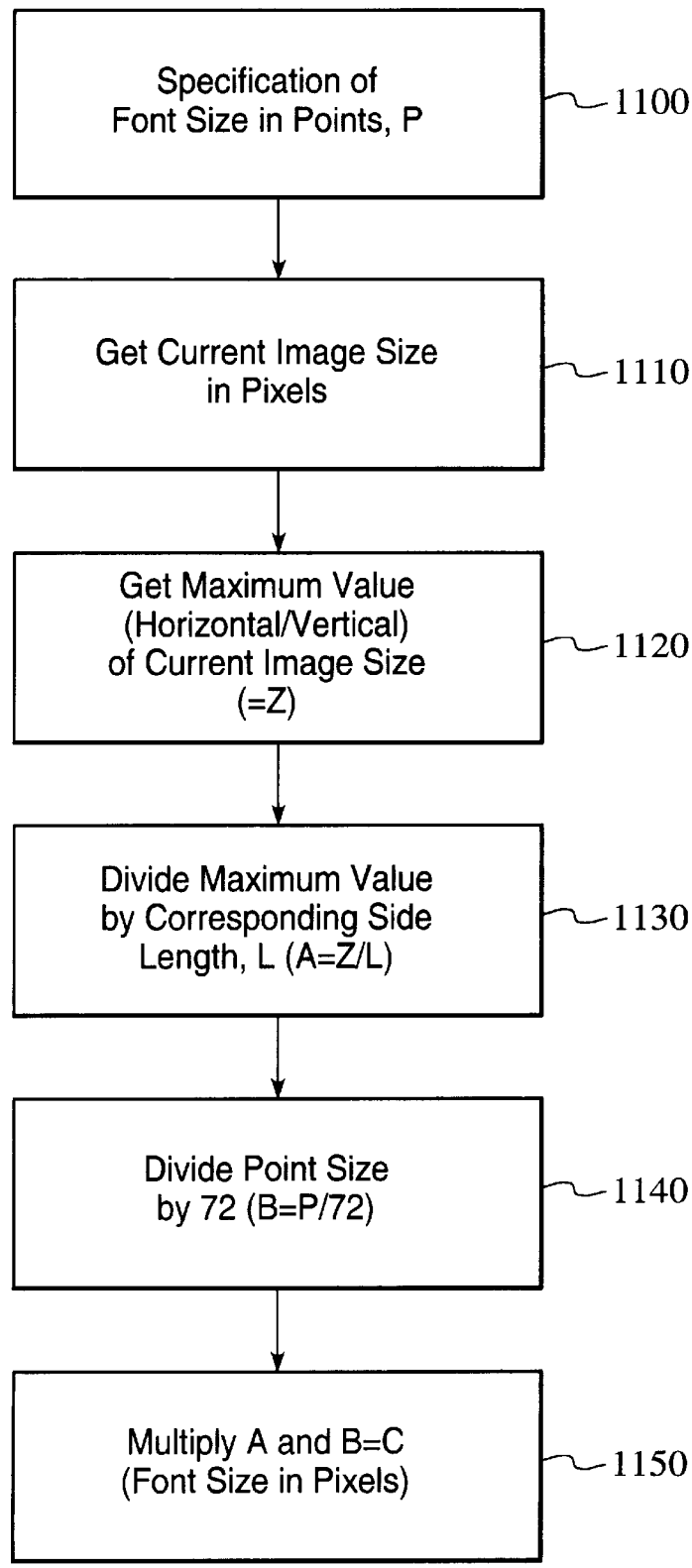
FIG. 13 illustrates a flow diagram for pixel value determination for automatic scaling operations in accordance with an aspect of the present invention.

Regardless of when stamp application occurs, preferably, the characteristics of the stamp that are specified are translated into pixel values which can then be automatically scaled with any changes in the size of the image. FIG. 13 illustrates an example of a process for translating a selected font size in points to a pixel value for a string stamp or a time-date stamp. The process begins with the selection of a font size (step 1100), for example 14 point. The current image size in pixels is then obtained (step 1110), for example 1024×768 pixels. A maximum value, Z, in pixels for the height/width of the image is then obtained (step 1120), e.g., 1024. The maximum value, Z, is then divided by the corresponding side length, L, in standard length units of the image, e.g., Z is divided by 6 for an assumed standard print size of 4×6 inches, to determine a pixel per inch ratio, A, for the image and resolution (step 1130). The specified point size is then divided by 72 to determine the character height in inches, B, since each point is equal to 1/72 of an inch, e.g., 14 is divided by 72 (step 1140). Of course, when other length units are used, an appropriate ratio of the point to the length unit is suitably used in step 1140. The font size in pixels is then determined by multiplying A, the determined number of pixels per inch, by B, the character height in inches, to provide the size of the font in pixels relative to the size and resolution of the image (step 1150).

Of course, similar calculations are suitably performed to determine the size of a given characteristic relative to the size and resolution of the image. Thus, similar ratios are used when the size of the given stamp characteristic is specified as a percentage of the image size. For example, 100% would be equivalent to the maximum number of pixels for a given side of the image, so that a determination of a number of pixels per percentage point could be calculated. The resulting ratio could then be used to determine the number of pixels for a chosen size expressed as a percentage of the image size. With the conversion into pixels, a given stamp characteristic is more readily adjusted to changes in the size of an image, for example, a change from a full size image to a quarter-size or half-size image, or upon zooming in or out in an image.

Although the present invention has been described in accordance with the embodiments shown, one of ordinary skill in the art will readily recognize that there could be variations to the embodiments and those variations would be within the spirit and scope of the present invention.

For example, although the stamping of images has been described in terms of processing in a digital camera, the processes involved with stamping may also be suitably performed by a host computer, rather than in the camera itself. Thus, raw image data may be captured, compressed and stored along with any selected information for stamping, including the time and date if desired, in the camera. At a later time, the data may then be transferred to a host computer for decompression, processing, and stamping, with the stamp data retrieved either from the image file from the camera or from a file on the host when the stamp data is selected in the host. The final stamped and processed image is then recompressed and stored.

By way of further example, the values for specifying the relative offsets for positioning a stamp may be supplied in pixels, which would provide a measure that is print size independent, i.e., the size of the output does not need to be known in order to use the numbers. Or, if the output size in known, then the values may be expressed in units such as inches or centimeters or pica.

Further, although the preferred embodiment is suitably performed via software within the camera, hardware implementations could also be used to perform the desired stamping as described herein. Accordingly, many modifications may be made by one of ordinary skill in the art without departing from the spirit and scope of the appended claims.

What is claimed is:

1. A method for positioning a stamp in a digital image captured with a digital image capture unit independently of the digital image orientation, the method comprising:
   selecting offset values for location of a stamp;
   placing the stamp in an image at the selected offset values; and
   applying the stamp to the digital image by storing the stamp in an image file for the digital image.

2. The method of claim 1 further comprising selecting data recorded on the image as the stamp, the data including time-date data, text data, and graphics data.

3. The method of claim 1 wherein selecting offset values further comprises selecting a percentage of a width and a height of the image as horizontal and vertical offset values of the stamp.

4. The method of claim 3 wherein selecting a percentage of 50% for the horizontal offset value centers the stamp along the width of the image.

5. The method of claim 4 wherein selecting a percentage of 50% for the vertical offset value centers the stamp along the height of the image.

6. The method of claim 1 wherein selecting offset values further comprises selecting a quadrant within the image.

7. The method of claim 6 wherein two positively signed offset values select a first quadrant of the image.

8. The method of claim 7 wherein the first quadrant is an upper left quadrant.

9. The method of claim 6 wherein two negatively signed offset values select a second quadrant of the image.

10. The method of claim 9 wherein the second quadrant is a lower right quadrant.

11. The method of claim 6 wherein one positively signed offset value and one negatively signed offset value select one of third and fourth quadrants of the image.

12. The method of claim 11 wherein the third and fourth quadrants further comprise an upper right quadrant and a lower left quadrant of the image.

13. A system for positioning a stamp in a digital image captured with a digital image capture unit independently of the digital image orientation, the system comprising:
    means for selecting offset values for location of a stamp;
    means for placing the stamp in an image at the selected offset values; and
    means for applying the stamp to the image by storing the stamp in an image file for the image.

14. The system of claim 13 wherein the means for selecting offset values further comprises means for selecting a quadrant within the image.

15. The system of claim 13 further comprising means for selecting data recorded on the image as the stamp, the data including time-date data, text data, and graphics data.

16. The system of claim 13 wherein the means for selecting offset values further comprises means for selecting a percentage of a width and a height of the image as horizontal and vertical offset values of the stamp.

17. The system of claim 16 wherein a means for selecting a percentage of 50% for the horizontal offset value centers the stamp along the width of the image.

18. The system of claim 17 wherein a means for selecting a percentage of 50% for the vertical offset value centers the stamp along the height of the image.

19. A method for positioning a stamp in a digital image captured with a digital image capture unit independently of the digital image orientation, the method comprising:
    selecting at least two offset values for a stamp;
    identifying an area in an image for placing the stamp based on the at least two offset values;
    positioning the stamp within the identified area based on the at least two offset values; and
    applying the stamp to the image by storing the stamp in an image file for the image.

20. The method of claim 17 wherein identifying an area of the image for positioning the stamp is based on a sign associated with each of the at least two offset values.

21. The method of claim 19 wherein the at least two offset values further comprise horizontal and vertical offset values.

22. The method of claim 21 wherein selecting further comprises expressing each of the at least two offset values as a percentage of a width and a height of the image.

23. The method of claim 22 further comprising positioning the stamp centered with the width of the image when the horizontal offset value is expressed as 50%.

24. The method of claim 23 further comprising positioning the stamp centered with the height of the image when the vertical offset value is expressed as 50%.

25. The method of claim 21 wherein the area comprises an upper left-hand quadrant of the image when the horizontal and vertical offset values are each a positive value.

26. The method of claim 25 wherein the stamp is top and left justified when the horizontal and vertical offset values are each a positive value.

27. The method of claim 25 wherein the area comprises a lower right-hand quadrant of the image when the horizontal and vertical offset values are each a negative value.

28. The method of claim 27 wherein the stamp is bottom and right justified when the horizontal and vertical offset values are each a negative value.

29. The method of claim 27 wherein the area comprises an upper right-hand quadrant of the image when the horizontal offset value is a negative value and the vertical offset value is a positive value.

30. The method of claim 29 wherein the stamp is top and right justified when the horizontal offset value is a negative value and the vertical offset value is a positive value.

31. The method of claim 29 wherein the area comprises a lower left-hand quadrant of the image when the horizontal offset value is a positive value and the vertical offset value is a negative value.

32. The method of claim 31 wherein the stamp is bottom and left justified when the horizontal offset value is a positive value and the vertical offset value is a negative value.

33. The method of claim 31 wherein the stamp is center justified when the horizontal and vertical offset values are expressed as 50%.

* * * * *